US009332444B2

(12) United States Patent
To et al.

(10) Patent No.: US 9,332,444 B2
(45) Date of Patent: May 3, 2016

(54) COMMUNICATION SYSTEM AND BASE STATION APPARATUS

(71) Applicant: Sharp Kabushiki Kaisha, Osaka-shi, Osaka (JP)

(72) Inventors: Shinpei To, Osaka (JP); Takashi Yoshimoto, Osaka (JP); Kozue Yokomakura, Osaka (JP); Ryota Yamada, Osaka (JP); Katsuya Kato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 98 days.

(21) Appl. No.: 14/354,693

(22) PCT Filed: Oct. 30, 2012

(86) PCT No.: PCT/JP2012/077927
§ 371 (c)(1),
(2) Date: Apr. 28, 2014

(87) PCT Pub. No.: WO2013/065654
PCT Pub. Date: May 10, 2013

(65) Prior Publication Data
US 2014/0315559 A1    Oct. 23, 2014

(30) Foreign Application Priority Data

Nov. 2, 2011  (JP) ................................. 2011-240749

(51) Int. Cl.
*H04W 24/02*    (2009.01)
*H04B 7/02*    (2006.01)
(Continued)

(52) U.S. Cl.
CPC .............. *H04W 24/02* (2013.01); *H04B 7/024* (2013.01); *H04B 7/0617* (2013.01); *H04B 7/0619* (2013.01); *H04W 72/0426* (2013.01); *H04W 92/20* (2013.01)

(58) Field of Classification Search
CPC .... H04B 7/024; H04B 7/0617; H04B 7/0619; H04W 24/02; H04W 72/0426; H04W 92/20
See application file for complete search history.

(56) References Cited

U.S. PATENT DOCUMENTS

2010/0246524 A1*  9/2010  Hou ...................... H04B 7/063
                                              370/329
2012/0135771 A1    5/2012  Futaki
(Continued)

FOREIGN PATENT DOCUMENTS

JP         2010-246113 A       10/2010
WO         2011/016560 A1       2/2011
WO     WO 2011052067 A1 *       5/2011 ............. H04B 7/024

OTHER PUBLICATIONS

Official Communication issued in International Patent Application No. PCT/JP2012/077927, mailed on Nov. 27, 2012.
(Continued)

*Primary Examiner* — Kashif Siddiqui
(74) *Attorney, Agent, or Firm* — Keating & Bennett, LLP (57) ABSTRACT

There is provided an invention whose object is to efficiently perform exchange of control information, for example, in the case where a plurality of cells cooperate to moderate inter-cell interference, like the IA technology.
There is provided a communication system in which there is a plurality of communication areas in which a base station apparatus and at least one terminal apparatus perform wireless communication, and the plurality of communication areas are adjacent to or overlap one another, wherein, in each communication area, in a case of performing cooperative control that performs communication while taking into consideration communication conditions in at least one another communication area, a base station apparatus in one communication area among the plurality of communication areas notifies a base station apparatus in another communication area of information for starting the cooperative control.

8 Claims, 7 Drawing Sheets

(51) Int. Cl.
*H04B 7/06* (2006.01)
*H04W 92/20* (2009.01)
*H04W 72/04* (2009.01)

(56) References Cited

U.S. PATENT DOCUMENTS

2012/0208599 A1* 8/2012 Tanaka .................. H04B 7/024
 455/561
2015/0326282 A1 11/2015 Futaki

OTHER PUBLICATIONS

Gomadam et al., "Approaching the Capacity of Wireless Networks through Distributed Interference Alignment", IEEE Global Telecommunications Conference, 2008, 11 pages.

Fujii et al., "Cooperative control for multiple base stations in an environment consisting of various cell sizes", The Institute of Electronics, Information and Communication Engineers, IEICE Technical Report RCS2011-84, Jul. 14, 2011, pp. 55-60.

* cited by examiner

COMMUNICATION SYSTEM AND BASE STATION APPARATUS

TECHNICAL FIELD

The present invention relates to a communication system or the like in which there is a plurality of communication areas in which a base station apparatus and at least one terminal apparatus perform wireless communication, and the plurality of communication areas are adjacent to or overlap one another.

BACKGROUND ART

A one-cell reuse cellular system that performs communication using the same frequency in all cells has been adopted as a standard in recent years since the system enhances frequency use efficiency and improves the maximum transmission speed in each cell. However, there is a problem that, because the same frequency is used in adjacent cells, due to the influence of interference coming from an adjacent cell, particularly the communication quality of a terminal apparatus positioned at a cell edge is deteriorated.

Interference Alignment (IA) has been proposed as an effective method of reducing interference in such a one-cell reuse cellular system (for example, see NPL 1). IA is technology that calculates a transmit weight and a receive weight by each of a plurality of transmitters (for example, base station apparatuses) and each of a plurality of receivers (for example, terminal apparatuses) in a cooperative manner such that the directions (vectors) of equivalent channels of interference signals coming from the transmitters serving as interference sources become orthogonal to the receive weight to be multiplied by receive signals in the receivers, and that performs transmission/reception using these transmit/receive weights. By performing such control, even in the case where interference signals, the number of which is greater than or equal to a number removable by the receivers (the degree of freedom) comes from adjacent cells, it becomes possible to remove these interference signals and to highly accurately extract desired signals from the receive signals.

Here, the case in which control is performed to enable a terminal apparatus in each cell to remove interference signals coming from a plurality of base station apparatuses has been described by way of example. In contrast, it is also possible to enable a base station apparatus in each cell to remove interference signals coming from a plurality of terminal apparatuses individually positioned in a plurality of cells.

In addition, such technology can be used to reduce interference between cells with different zone radii in a system in which there is a plurality of picocells or femtocells in a macrocell.

CITATION LIST

Patent Literature

Non Patent Literature

NPL 1: "Approaching the Capacity of Wireless Networks through Distributed Interference Alignment", IEEE GLOBECOM 2008.

SUMMARY OF INVENTION

Technical Problem

The IA technology described in NPL 1 is technology that makes the most of the degree of freedom of transmitters/receivers by causing base station apparatuses and terminal apparatuses in a plurality of cells to cooperate with each other and to individually use transmit/receive weights that can moderate inter-cell interference given to each other, thereby efficiently performing communication. In the case where the IA technology as such is applied to an actual cellular system or the like, it is necessary to determine in advance a procedure regarding how a plurality of base station apparatuses and a plurality of terminal apparatuses that communicate with the base station apparatuses cooperate with each other.

However, because transmitters/receivers in a plurality of cells that originally operate independently are serving as targets, a problem such that the efficiency is degraded or the interference is not efficiently moderated may occur depending on the incorporated procedure.

In view of the above-described problem, there is provided an invention whose object is to efficiently perform exchange of control information, for example, in the case where a plurality of cells cooperate to moderate inter-cell interference, like the IA technology. In addition, there is also provided an invention applicable not only to the IA technology, but also to other technology in which moderation of inter-cell interference is cooperatively performed by a plurality of cells.

Solution to Problem

In view of the above-described problem, a communication system of the present invention is:

a communication system in which there is a plurality of communication areas in which a base station apparatus and at least one terminal apparatus perform wireless communication, and the plurality of communication areas are adjacent to or overlap one another, wherein, in each communication area, in a case of performing cooperative control that performs communication while taking into consideration communication conditions in at least one another communication area, a base station apparatus in one communication area among the plurality of communication areas notifies a base station apparatus in another communication area of information for starting the cooperative control.

In addition, in the communication system of the present invention, a base station apparatus to be notified of information for starting the cooperative control is selected in accordance with communication conditions in each communication area.

In addition, in the communication system of the present invention, a base station apparatus to be notified of information for starting the cooperative control is selected from among the plurality of communication areas in a predetermined order.

In addition, in the communication system of the present invention, the maximum number of communication areas that perform the cooperative control is set in advance, and information representing that number is retained by each base station apparatus.

A base station apparatus of the present invention is:

a base station apparatus that performs wireless communication with at least one terminal apparatus in each of a plurality of communication areas that are adjacent to or overlap one another, wherein, in each communication area, in a case of performing cooperative control that performs communication while taking into consideration communication conditions in at least one another communication area, the base station apparatus notifies a base station apparatus in another communication area of information for starting the cooperative control.

Advantageous Effects of Invention

It becomes possible to efficiently perform exchange of control information, for example, in the case where a plurality of cells cooperate to moderate inter-cell interference, like the IA technology, and the advantageous effects of the inter-cell interference moderation technology can be achieved in an actual system. Therefore, even in the case where communication is performed in a plurality of cells using the same frequency, inter-cell interference can be efficiently moderated in each cell, thereby achieving good receive characteristics.

DESCRIPTION OF EMBODIMENTS

Hereinafter, the best mode for carrying out the invention will be described with reference to the drawings.

[1. First Embodiment]
[1.1 Overall Description]

A first embodiment to which the present invention is applied is targeted to a cellular system in which there are a base station apparatus (a control apparatus that controls communication in a cell) and a terminal apparatus in each of a plurality of cells, and the base station apparatus and the terminal apparatus perform communication in each cell. An example of such a system is illustrated in FIG. 1.

Figure 1:
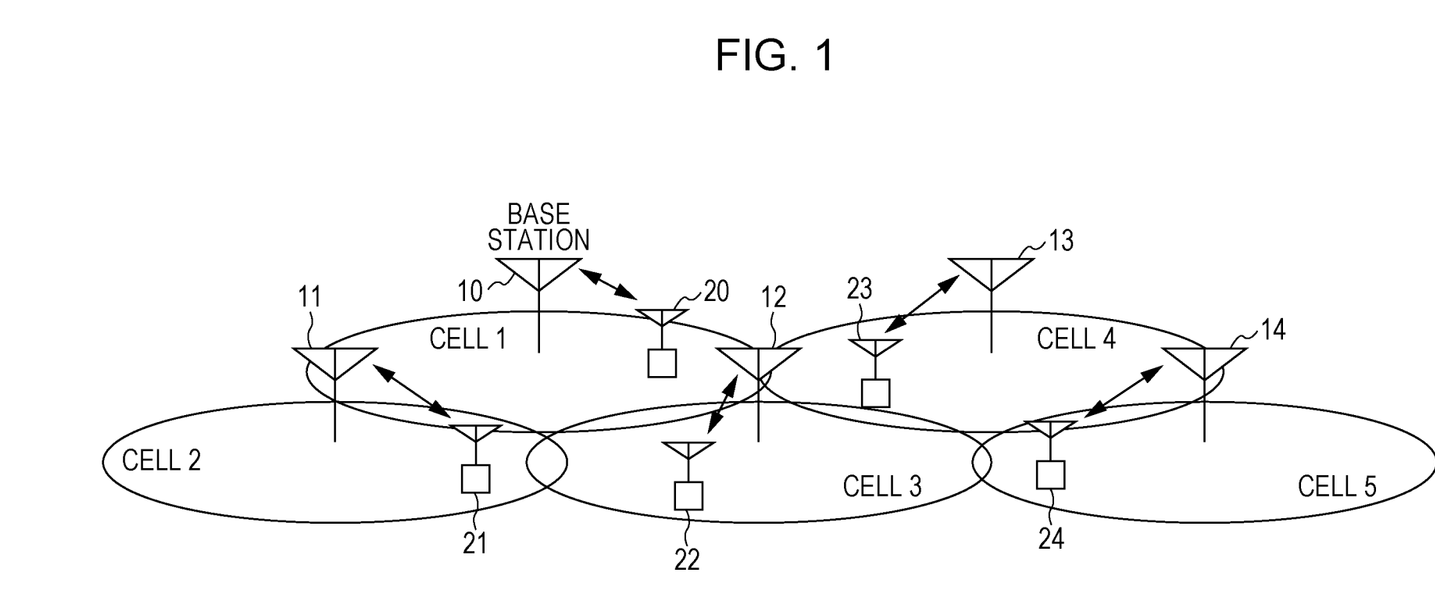
FIG. 1 is a diagram for describing the entirety according to this embodiment.

FIG. 1 illustrates how a base station apparatus and a terminal apparatus perform communication in each of five cells 1 to 5. Hereinafter, a control procedure in the case where a base station apparatus and a terminal apparatus in each cell cooperate with each other to use the IA technology in such a cellular system will be discussed.

As illustrated in FIG. 1, this embodiment is targeted to a system in which a plurality of cells, the number of which is five or less, cooperate with one another and perform communication so as not to interfere with one another. In a general cellular system, each cell operates independently. Therefore, a special procedure is necessary in order to start cooperative control. Here, it is assumed that control is started with a procedure in which one cell notifies another cell to start cooperative control, and this other cell gives a response to this notification.

Figure 2:
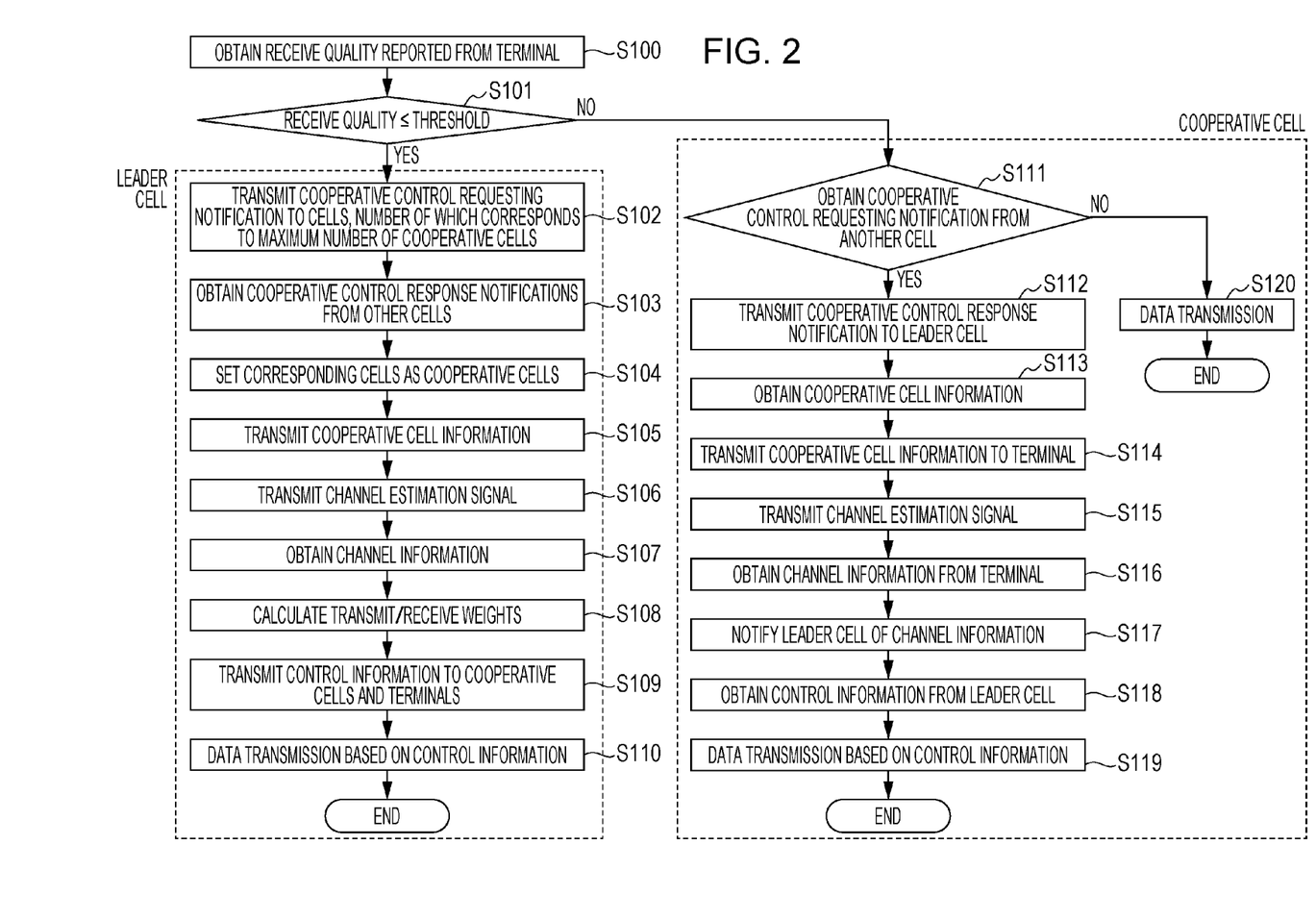
FIG. 2 is a diagram for describing the flow of a process of a base station apparatus according to a first embodiment.

Here, a cell that notifies another cell to start cooperative control is referred to as a "leader cell", and a cell that gives a response to this notification from the leader cell is referred to as a "cooperative cell". The operation of a base station apparatus in each of a leader cell and a cooperative cell is illustrated in FIG. 2. Note that, although there is only one cooperative cell flow, it is assumed that there is actually a plurality of cooperative cells.

As indicated in S100 and S101 in FIG. 2, in this embodiment, it is assumed that each cell is operating, without distinction between a leader cell and a cooperative cell, at the beginning.

[1.2 Description of Process]

First, the flow of a process according to this embodiment will be described. FIG. 2 is a diagram illustrating a process regarding a base station apparatus.

First, a base station apparatus in each cell periodically or non-periodically obtains information regarding receive quality from a terminal apparatus in the cell managed by the base station apparatus (step S100). It is assumed that the receive quality here corresponds to a numeral including an element regarding interference (inter-cell interference), such as reception SINR (Signal to Interference plus Noise power Ratio).

The receive quality reported from each terminal apparatus is compared with a predetermined threshold (step S101). If the comparison result indicates that it is determined that the receive quality is less than or equal to the threshold (step S101; Yes), the process proceeds to step S102, and this cell operates as a leader cell. In contrast, if it is determined that the receive quality is greater than the threshold (step S101; No), the process proceeds to step S111, and this cell operates as a cell that is not a leader cell (a cooperative cell).

In this manner, in this embodiment, whether a cell becomes a leader cell is determined in accordance with receive quality reported from a terminal apparatus. This is because of the following. Cooperative control technology such as the IA technology serving as a target in this embodiment is technology that demonstrates its effect when the influence of inter-cell interference is great. In particular, when a cell where the influence of interference is great calls another cell to perform cooperative control and starts the cooperative control, the receive quality deteriorated by the influence of interference can be improved.

Note that, not only a base station apparatus determines whether a cell to which the base station apparatus belongs becomes a leader cell in accordance with receive quality reported from a terminal apparatus, such determination may be performed on the basis of receive quality of the base station apparatus itself. In addition, control such as that in which a terminal apparatus notifies a base station apparatus of information requesting to become a leader cell, and the base station apparatus, which has received the information, operates as a leader cell may be performed. In addition, a cell in which the number of terminal apparatuses exceeds a predetermined number, which results in receive quality less than or equal to the threshold, may operate as a leader cell.

The operation of a cell that is to operate as a leader cell on the basis of these criteria will be discussed below. As a result of determination in step S101, a cell that becomes a leader cell transmits a cooperative control requesting notification to peripheral cells (step S102). This is a notification to request peripheral cells to start cooperative control. Here, it is assumed that a cell that has received this notification agrees to start cooperative control and becomes a cooperative cell. Although it is assumed that such information exchange between base station apparatuses is basically performed via wired lines, it is not limited to this case. Such information exchange may be performed by wireless communication.

Here, basically a cooperative control requesting notification may be given to any cell. In general, this notification is given to a few peripheral cells. For example, in FIG. 1, in the case where the cell 3 becomes a leader cell, a cooperative control requesting notification is given to the base station apparatuses in the peripheral cells 1, 2, 4, and 5.

S102 in FIG. 2 is an example in which a cooperative control requesting notification is transmitted to cells, the number of which corresponds to the maximum number of cooperative cells. The maximum number of cooperative cells is the number of cells serving as partners to which a cooperative control requesting notification is transmitted. In this case, the maximum number of cooperative cells may be determined in advance or may be changed in accordance with circumstances. Alternatively, a cooperative control requesting notification may be given to an arbitrary number of cells, the number of which is less than or equal to the maximum number of cooperative cells. In the case where the maximum number of cooperative cells is determined in advance, the maximum number of cooperative cells to be set may be adjusted in accordance with the cell size or what the environment in which the cell is positioned is like.

The adjustment is such that, for example, the maximum number of cooperative cells is set to a large number in the case where the cell radius is greater than or equal to a certain value, and the maximum number of cooperative cells is set to a small number in the case where the cell radius is less than or equal to the certain value. In addition, the maximum number of cooperative cells may be set to a large number in a macrocell, and the maximum number of cooperative cells may be set to a small number in a small cell such as a picocell.

Furthermore, the adjustment such that the maximum number of cooperative cells is set to a large number in a cell positioned in an urban area, and the maximum number of cooperative cells is set to a small number in a suburb is possible. In this manner, the leader cell gives a cooperative control requesting notification to cells, the number of which corresponds to the maximum number of cooperative cells set in accordance with the size or environment of the cell (leader cell) or the like.

Note that, in the case where the maximum number of cooperative cells is determined for each cell, among a plurality of cells that perform cooperative control, it is preferable to perform control in accordance with a cell where the maximum number of cooperative cells is the smallest, and it is preferable that these cells share in advance information regarding their maximum numbers of cooperative cells.

In short, the cells notify one another or the cells are notified by a centralized control station of an operator of information regarding the maximum number of cooperative cells. In contrast to the case in which the maximum number of cooperative cells is determined for each cell as above, a certain number of cells may be treated as a cell group, and the maximum number of cooperative cells may be determined for each cell group. In this case, the maximum number of cooperative cells of cells belonging to each cell group is the number determined for that cell group.

In addition, as an example of the case in which the maximum number of cooperative cells is changed in accordance with circumstances, the case is conceivable in which candidates for the maximum number of cooperative cells are determined at a few levels in advance, and the maximum number of cells is selected from among these candidates in accordance with the communication conditions in peripheral cells, the number of receive antennas of a terminal apparatus serving as a communication target, and the like. In this case, the leader cell can efficiently select the maximum number of cooperative cells by grasping in advance the communication conditions in peripheral cells and what the functions of terminal apparatuses in peripheral cells are like.

In this manner, after a cooperative control requesting notification is transmitted to cells, the number of which corresponds to the maximum number of cooperative cells, a response to this notification is sent from each cell. Thus, response notifications (cooperative control response notifications) are obtained from these other cells (step S103).

By obtaining the response notifications, it can be confirmed that the cells serving as partners to which the cooperative control requesting notification has been sent have agreed with the cooperative notification, and these cells are set as cooperative cells (step S104).

Information indicating which cells operate as cooperative cells (cooperative cell information) is transmitted to all cooperative cells (step S105). This is because that, because each cooperative cell can recognize which cell is the leader cell but cannot recognize which other cells are cooperative cells, the leader cell notifies all cells that perform cooperative control of this information and causes all the cells to recognize which cells are cooperative cells.

In this case, all the cooperative cells can share information by notifying, by the leader cell, all the cooperative cells of the cell IDs of the cooperative cells or the like. In addition, this cooperative cell information is also sent to a terminal apparatus in the leader cell.

Next, it is necessary for the leader cell to obtain channel information that becomes necessary to perform cooperative control such as the IA technology serving as a target in this embodiment. The leader cell transmits a channel estimation signal for causing a terminal apparatus to estimate a channel (step S106). The channel estimation signal is an existing signal transmitted not to overlap any cooperative cell. A terminal apparatus in each cell that has received this signal can estimate a channel with the base station apparatus in the leader cell.

Here, a terminal apparatus in each cell also estimates a channel with the base station apparatus in each cooperative cell (see the description of step S115 later). The base station apparatus in the leader cell obtains information regarding a channel between each terminal apparatus and each base station apparatus (step S107). In this case, the base station apparatus in the leader cell obtains information regarding a channel, which has been estimated by a terminal apparatus in the leader cell, directly from the terminal apparatus.

In addition, the base station apparatus in the leader cell also obtains channel information estimated by a terminal apparatus in each cooperative cell via the base station apparatus in that cooperative cell (see the description of steps S116 and S117 later). This can be performed by notifying the base station apparatus in each cooperative cell of channel information estimated by a terminal apparatus in that cooperative cell and then notifying, by the base station apparatus in each cooperative cell, the base station apparatus in the leader cell of the channel information.

Here, channel information that becomes necessary in the case where cooperative control such as the IA technology is performed is the result of estimating, by each terminal apparatus, channel variations with all base station apparatuses that perform cooperative control. It is necessary for each terminal apparatus to estimate channel variations with the base station apparatus in the leader cell and in each cooperative cell, and to notify the base station apparatus to which the terminal apparatus is connected of the result.

In this case, it is assumed that each terminal apparatus grasps which cells are cells that perform cooperative control from cooperative cell information sent from the base station apparatus in the leader cell. Note that a terminal apparatus in each cooperative cell can obtain cooperative cell information by transmitting, by the base station apparatus in the cooperative cell, information that has been sent from the leader cell to the cooperative cell to the terminal apparatus in the cell.

In this manner, the base station apparatus in the leader cell, which has obtained all items of channel information, calculates transmit/receive weights using these items of information (step S108). Here, the IA technology serving as a target in this embodiment calculates transmit/receive weights such that the directions (vectors) of equivalent channels of interference signals coming from a plurality of transmitters (for example, base station apparatuses) serving as interference sources become orthogonal to the receive weight to be multiplied by receive signals in a plurality of receivers (for example, terminal apparatuses).

Figure 3:
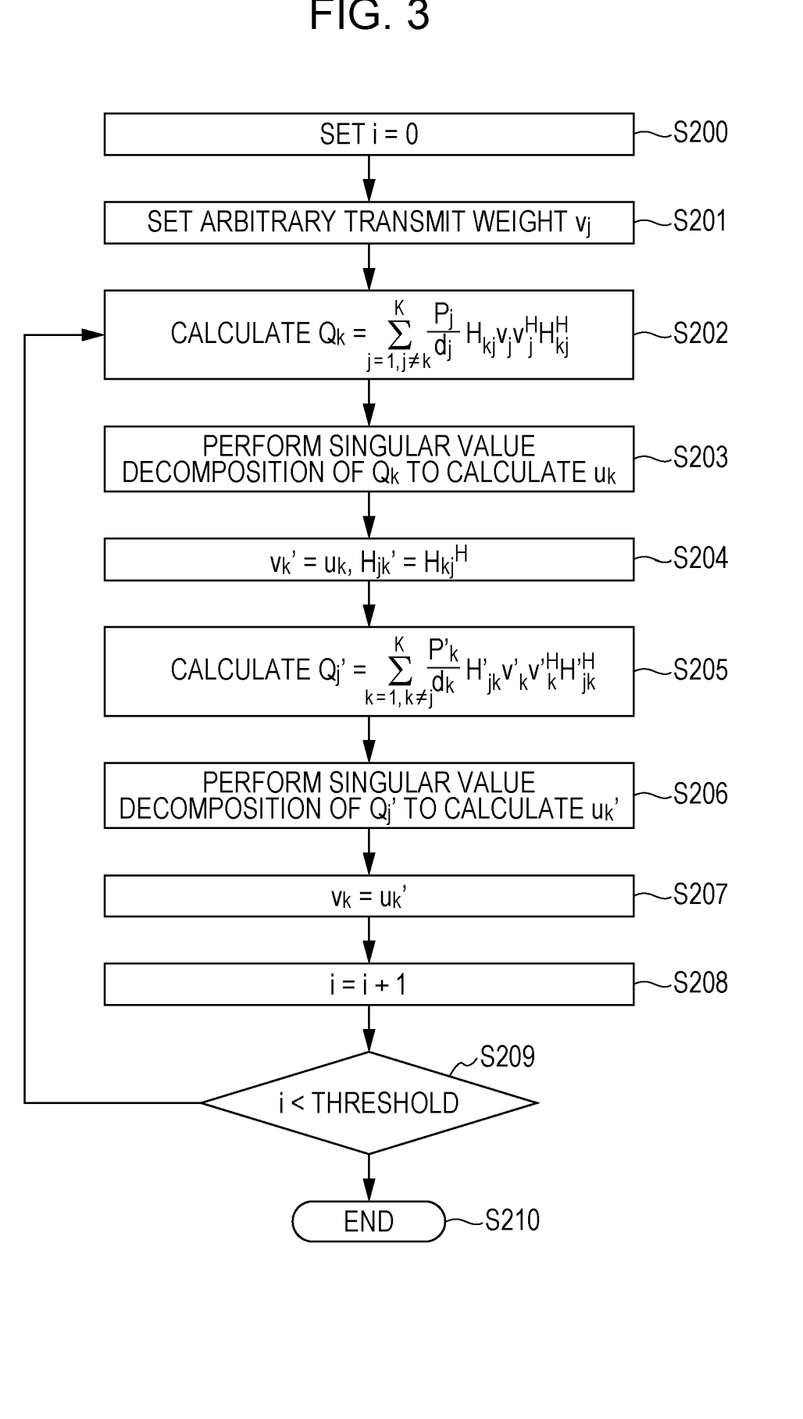
FIG. 3 is a diagram for describing the flow of a process of the base station apparatus according to the first embodiment.

Several methods are proposed as this calculation method. In the case where there are three or more pairs of a transmitter/receiver, a calculation method using a repetition algorithm is general. This embodiment is about a control procedure in the case where the IA technology or cooperative control technology similar to the IA technology is performed, and is not about a detailed calculation method of weights used in performing such control. Thus, the most basic one among algorithms in the IA technology is illustrated in FIG. 3.

Note that $H_{kj}$ represents channel variations between the base station apparatus in cell j and a terminal apparatus in cell k (terminal apparatus serving as a target of cooperative control), and $H_{jk}'$ represents channel variations between the terminal apparatus in cell k and the base station apparatus in cell j. In addition, v represents a transmit weight, u represents a receive weight, and Q is the covariance matrix of an interference signal to be received. In addition, P is transmit power, d is the number of streams to be transmitted, and K is the number of cells serving as targets of cooperative control.

First, i=0 is set (step S200), and an arbitrary transmit weight $v_j$ is set (step S201). Next, $Q_k$ is calculated on the basis of the following equation 1 (step S202):

$$Q_k = \sum_{j=1, j \neq k}^{K} \frac{P_j}{d_j} H_{kj} v_j v_j^H H_{kj}^H \qquad [\text{Math. 1}]$$

Next, $Q_k$ is subjected to singular value decomposition, thereby calculating $u_k$ (step S203). Then, $v_k' = u_k$, and $H_{jk}' = H_{kj}^H$ (step S204). Thereafter, $Q_j'$ is calculated on the basis of the following equation 2 (step S205):

$$Q_j' = \sum_{k=1, k \neq j}^{K} \frac{P_k'}{d_k} H_{jk}' v_k' v_k'^H H_{jk}'^H \qquad [\text{Math. 2}]$$

Next, $Q_j'$ is subjected to singular value decomposition, thereby calculating $u_k'$ (step S206). Then, substitution $v_k = u_k'$ is performed (step S207), and 1 is added to i (step S208). Here, in the case where the value of i exceeds a threshold, the process ends (step S209; Yes to step S210), and, in the case where the value of i does not exceed the threshold, the process is repeatedly executed from step S202.

In this manner, the algorithm illustrated in FIG. 3 obtains weights that minimize the influence of interference while exchanging the roles of transmission and reception by using the duality of a channel, that is, a characteristic that the complex conjugate transposed matrix of a channel matrix from a base station apparatus to a terminal apparatus becomes a channel matrix from the terminal apparatus to the base station apparatus.

Exchanging the roles of transmission and reception can be realized by performing arithmetic operations in the case where the base station apparatus operates as a transmitter and the terminal apparatus operates as a receiver in step S202 and step S203, and performing arithmetic operations in the case where the terminal apparatus operates as a transmitter and the base station apparatus operates as a receiver in step S205 and step S206.

In step S203 and step S206, among the left-singular vectors obtained by subjecting the covariance matrix Q of interference to singular value decomposition, a vector that corresponds to a small singular value is selected for the number of streams, and the vector serves as the weight u.

Since a weight is repeatedly updated such that a weight corresponding to a small singular value (weight that moderates interference power) is used as above, after the number of repetitions determined in advance, a weight that can moderate the influence of interference can be obtained. By using v obtained as above as a transmit weight and u as a receive weight, a plurality of cells can cooperate to moderate the influence of interference. Note that this algorithm is only exemplary, and other algorithms may be used.

The transmit/receive weights calculated as above in the leader cell are given as a notification of control information to a terminal apparatus in each cooperative cell and the leader cell, as indicated in step S109 in FIG. 2 (step S109). By giving such a notification, the transmit/receive weights collectively calculated by the leader cell can also be grasped by each cooperative cell and can be used for data transmission (step S110). This control information may include, besides information regarding the transmit/receive weights, information regarding the timing of using the calculated transmit/receive weights, or the like.

With the above procedure, a cell where the receive quality is deteriorated can become a leader cell, call peripheral cells to conduct cooperative control, obtain transmit/receive weights on the basis of channel information collected from each cooperative cell, and notify each cell of the transmit/receive weights, thereby performing data transmission in which a plurality of cells cooperate to moderate interference.

In contrast, in the case where it is determined in step S101 that the receive quality is greater than the threshold (step S101; No), the process proceeds to step S111, and this cell operates as a cell that is not a leader cell.

In this case, in the case where this cell receives a cooperative control requesting notification from another cell (leader cell), this cell operates as a cooperative cell; in the case where this cell does not receive a cooperative control requesting notification, this cell operates as a general cell that performs no cooperative control.

First, in the case where this cell receives (obtains) a cooperative control requesting notification from another cell and operates as a cooperative cell, the cell returns response information (cooperative control response notification) in response to the request from the leader cell (step S112). Thereafter, cooperative cell information indicating which cells are cooperative cells is sent from the leader cell. The cell receives this cooperative cell information, and obtains, for example, the cell ID of each cooperative cell from the cooperative cell information (step S113). The cell notifies a terminal apparatus in this cell of this cooperative cell information (step S114).

Next, this cell transmits a channel estimation signal for causing the terminal apparatus to estimate a channel (step S115). The channel estimation signal is an existing signal transmitted not to overlap the leader cell or any cooperative cell. Because the terminal apparatus which has been notified of the cooperative cell information can grasp which cells are cells that perform cooperative control, the terminal apparatus can estimate a channel with the base station apparatus in each of these cells (including the leader cell) on the basis of the channel estimation signal.

In this manner, after estimating a channel with the base station apparatus in each cell (including the leader cell), the terminal apparatus notifies the base station apparatus of channel information. The base station apparatus in each cooperative cell obtains channel information notified by a terminal apparatus in that cell (step S116), and notifies the leader cell of the obtained channel information (step S117). By notifying, by each cooperative cell, the leader cell of channel information as above, the leader cell can collectively obtain transmit/receive weights. Since information regarding the transmit/receive weights calculated by the leader cell is given as a notification to each cooperative cell, each cooperative cell obtains the control information from the leader cell (step S118). In the same resources of the leader cell and all the cooperative cells, data transmission is performed using the transmit/receive weights calculated in the leader cell (step S119).

In addition, in the case where a cooperative control requesting notification is not received in step S111 (step S111; No), it means that there is no cell that desires to perform cooperative control (leader cell) around. As indicated in step S120, general data transmission, that is, data transmission without performing cooperative control serving as a target in this embodiment, is performed.

With the above procedure, a cell in which the receive quality is greater than or equal to the threshold can become a cooperative cell and perform cooperative control in response to calling from the leader cell. By using the transmit/receive weights collectively calculated by the leader cell on the basis of a channel estimated in each cell, data transmission in which a plurality of cells cooperate to moderate interference can be performed.

Next, the operation of each terminal apparatus according to this embodiment will be described using FIG. 4. In this embodiment, it is assumed that a terminal apparatus belonging to any cell operates in the same manner, although there are differences in the roles of cells, namely, a leader cell and a cooperative cell.

Figure 4:
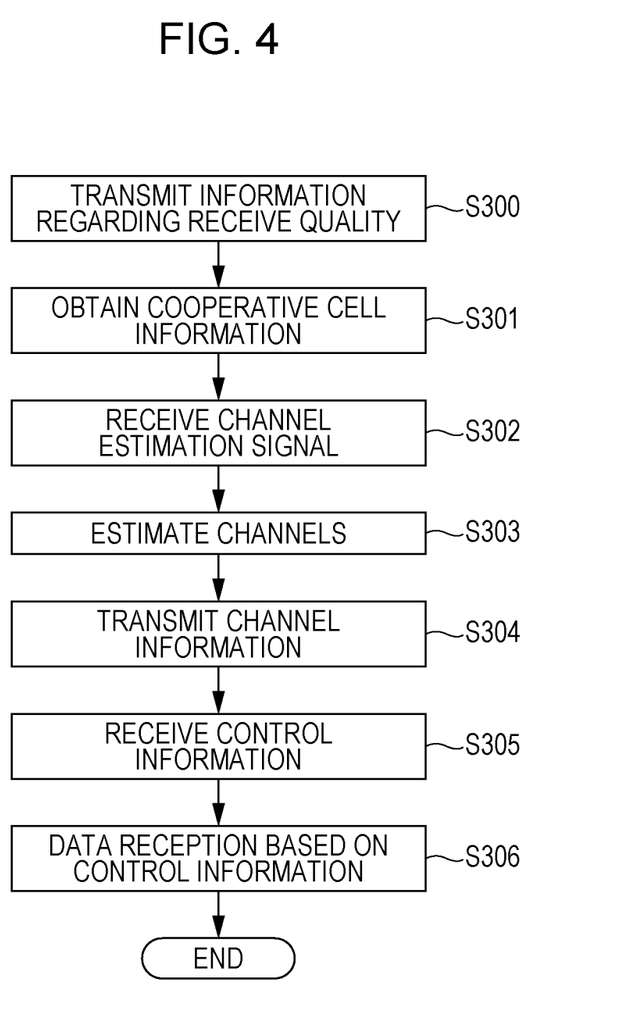
FIG. 4 is a diagram for describing the flow of a process of the base station apparatus according to the first embodiment.

As illustrated in FIG. 4, each terminal apparatus periodically or non-periodically transmits information regarding receive quality to the base station apparatus in a cell to which the terminal apparatus belongs (step S300). As indicated in step S105 and step S114 in FIG. 2, since the base station apparatus transmits cooperative cell information, the terminal apparatus obtains this information (step S301).

Then, each terminal apparatus determines which cells are cells that perform cooperative control on the basis of this cooperative cell information, and next receives a channel estimation signal transmitted from each base station apparatus (step S302). Upon receipt of the channel estimation signals, each terminal apparatus estimates channels after identifying which channel estimation signal is sent from which base station apparatus (step S303).

Next, each terminal apparatus transmits information regarding the estimated channel variations to the base station apparatus in a cell to which the terminal apparatus belongs (step S304). Using the channel information, the base station apparatus in the leader cell calculates transmit/receive weights in performing cooperative control in accordance with an algorithm such as that illustrated in FIG. 3 (step S108 in FIG. 2), and transmits information regarding the calculated weights as control information (step S109 in FIG. 2). Each terminal apparatus receives this control information (step S305).

Note that a terminal apparatus belonging to a cooperative cell receives control information reported from the base station apparatus in the leader cell to the base station apparatus in the cooperative cell via the base station apparatus in the cooperative cell. Since data transmission using the calculated transmit weight is performed in each cell, each terminal apparatus receives these signals, and combines the signals using the receive weight reported in the control information. Accordingly, data reception based on the control information is performed (step S306).

By performing the above control, each base station apparatus is notified of channel information that becomes necessary in performing cooperative control in this embodiment, and data signals can be received using a receive weight for the cooperative control, which is calculated on the basis of the channel information. Accordingly, interference from other cells can be moderated, and, even in the case where transmission in which a plurality of adjacent cells use the same frequency band is performed, good receive quality can be secured.

[1.3 Apparatus Configuration]

Figure 5:
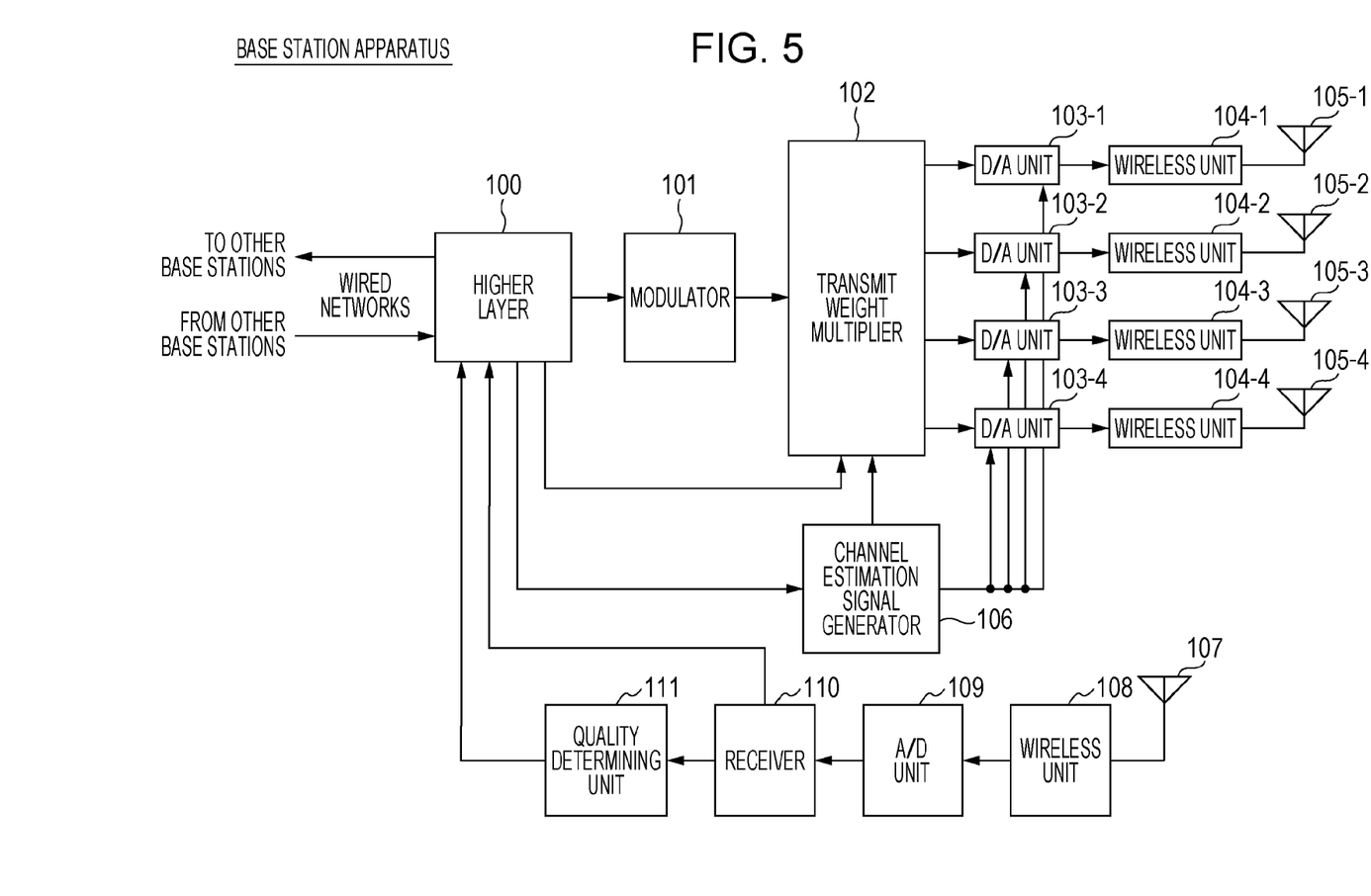
FIG. 5 is a diagram for describing the configuration of the base station apparatus according to the first embodiment.

Next, the apparatus configuration of each base station apparatus according to this embodiment is illustrated in FIG. 5. It is assumed that the number of transmit antennas is four, and a base station apparatus in a leader cell and a base station apparatus in a cooperative cell have the same configuration. As illustrated in FIG. 5, each base station apparatus according to this embodiment includes a higher layer 100, a modulator 101, a transmit weight multiplier 102, D/A units 103-1 to 103-4, wireless units 104-1 to 104-4 and 108, transmit antenna units 105-1 to 105-4, a channel estimation signal generator 106, a receive antenna unit 107, an A/D unit 109, a receiver 110, and a quality determining unit 111. Although the number of receive antennas is one here, the number of receive antennas is not limited to one. Any number of antennas may be included. In addition, a configuration in which a transmit antenna and a receive antenna are shared may be used.

In the base station apparatus in FIG. 5, information regarding receive quality indicated in step S100 in FIG. 2 is obtained by the receiver 110 after the wireless unit 108 performs frequency conversion of a signal received by the receive antenna unit 107, and the A/D unit 109 performs A/D conversion of the frequency-converted signal.

Step S101 in FIG. 2 is performed by the quality determining unit 111. This determination result is reported to the higher layer 100, and it is determined whether to proceed to step S102 in FIG. 2 or to step S111 in FIG. 2. In the leader cell, processing in step S102 onward is performed; in cooperative cells, processing in step S111 onward is performed. In the processing, it is assumed that information exchange between cells is performed via a wired network.

In addition, it is assumed that information exchange with a terminal apparatus is performed by wireless communication. Data in the higher layer 100 is modulated by the modulator 101, goes through the transmit weight multiplier 102, and converted into analog signals by the D/A units 103-1 to 103-4, converted into wireless frequencies by the wireless units 104-1 to 104-4, and then transmitted from the transmit antenna units 105-1 to 105-4. In transmission of control information, however, no multiplication by a transmit weight is performed by the transmit weight multiplier 102.

In contrast, in the case of transmission of a data signal (steps S110 and S119 in FIG. 2), multiplication by a transmit weight calculated in step S108 is performed by the transmit weight multiplier 102.

Here, it is assumed that channel information from the receive antenna unit 107 and wired networks is collected to the higher layer 100 in the leader cell, and calculation of transmit/receive weights is performed. In addition, a channel estimation signal is generated and transmitted by the channel estimation signal generator 106. In addition, it is assumed that information such as the number of maximum cooperative cells is retained in the higher layer 100, and, exchange of such information between cells is performed via a wired network.

Figure 6:
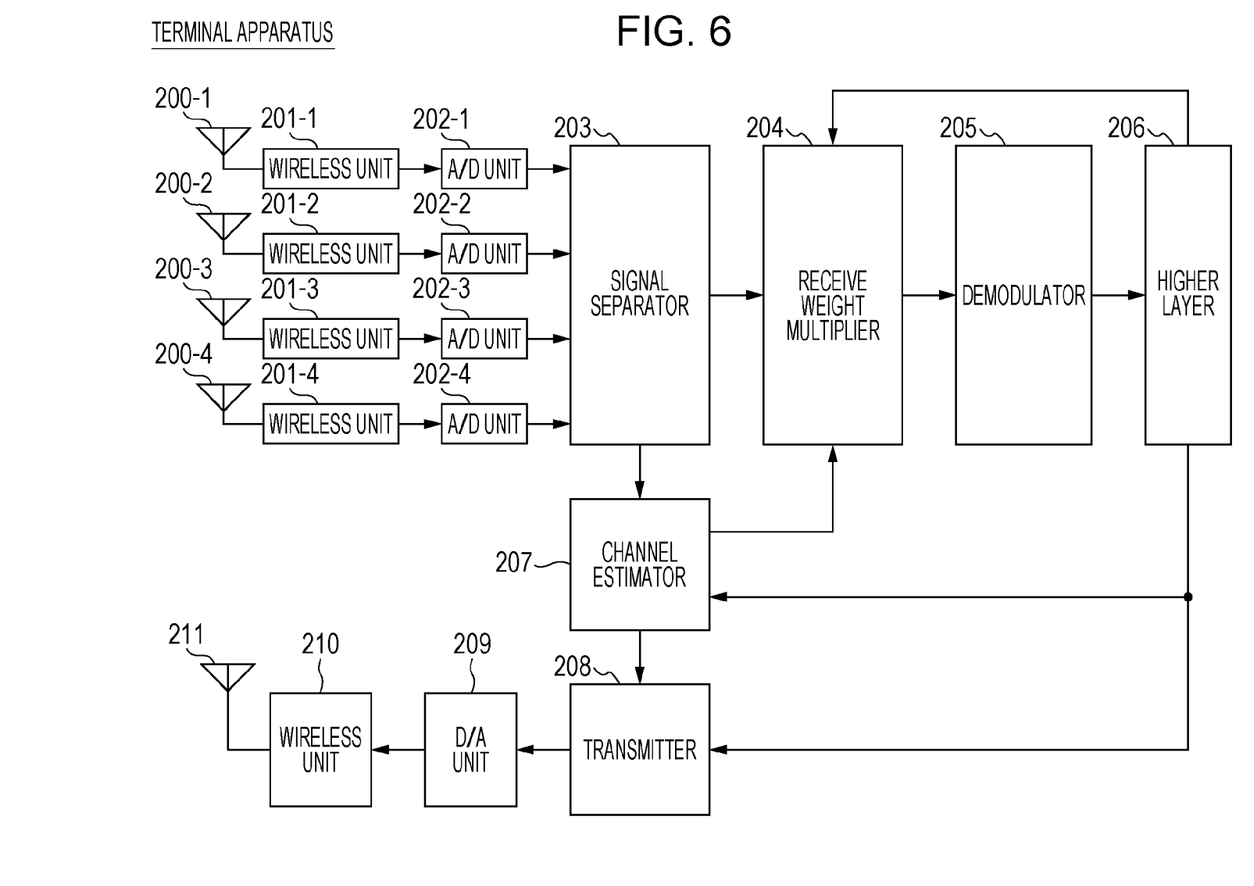
FIG. 6 is a diagram for describing the configuration of a terminal apparatus according to the first embodiment.

Next, the apparatus configuration of each terminal apparatus according to this embodiment is illustrated in FIG. 6. Note that it is assumed that the number of receive antennas is four, and a terminal apparatus belonging to either of a leader cell and a cooperative cell has the same configuration. As illustrated in FIG. 6, each terminal apparatus according to this embodiment includes receive antenna units 200-1 to 200-4, wireless units 201-1 to 201-4 and 210, A/D units 202-1 to 202-4, a signal separator 203, a receive weight multiplier 204, a demodulator 205, a higher layer 206, a channel estimator 207, a transmitter 208, a D/A unit 209, and a transmit antenna 211. Although the number of transmit antennas is one here, the number of transmit antennas is not limited to one. Any number of antennas may be included. In addition, a configuration in which a transmit antenna and a receive antenna are shared may be used.

In the terminal apparatus in FIG. 6, signals received via the receive antenna units 200-1 to 200-4 and the wireless units 201-1 to 201-4 are A/D-converted by the A/D units 202-1 to 202-4, and then the signals are input to the signal separator 203. Here, in the case where a channel estimation signal indicated in step S302 in FIG. 4 is received, the received signal is output by the signal separator 203 to the channel estimator 207, and channel estimation is performed. In this channel estimation, a channel with the base station apparatus in a cell serving as a target of cooperative control is appropriately estimated on the basis of cooperative cell information reported from the base station apparatus, subjected to processing such as demodulation, and retained in the higher layer. The channel estimation result is input to the transmitter 208, and transmitted to the base station apparatus.

Upon receipt of cooperative cell information, a receive weight calculated on the basis of channel variations estimated by the channel estimator 207 using a demodulation channel estimation signal added to the cooperative cell information is used.

In addition, the channel estimator 207 can calculate power of a received signal (the norm of a channel) or the like, and can send, as a feedback, this as receive quality to the base station apparatus (corresponding to step S300 in FIG. 4). In addition, control information that is sent from the base station apparatus and that includes information regarding a receive weight is also subjected to processing such as demodulation, and then sent from the higher layer 206 to the receive weight multiplier 204, and is used as a receive weight in data transmission.

In contrast, in the case where a data signal has been received (step S306 in FIG. 4), the signal separator 203 outputs the data signal to the receive weight multiplier 204, the receive weight multiplier 204 multiples the data signal input from the signal separator 203 by the receive weight input from the higher layer 206, and the demodulator 205 demodulates the result to obtain a data signal.

With such a configuration, each base station apparatus can be notified of channel information that becomes necessary when performing cooperative control in this embodiment, and a data signal can be received using a receive weight for cooperative control, calculated on the basis of the channel information.

Although whether to become a leader cell is determined in accordance with the receive quality in this embodiment, whether to become a leader cell may be determined not only in accordance with the receive quality, but also in accordance with the cell traffic. This corresponds to the case in which, for example, a cell whose traffic is greater than or equal to a threshold operates as a leader cell. In addition, a cell to which terminal apparatuses, the number of which exceeds a certain number, are connected may operate as a leader cell.

In addition, although the example in which the base station apparatus in a cell that has received a cooperative control requesting notification sends a cooperative control response notification to the leader cell and becomes a cooperative cell has been discussed in this embodiment, even in the case where a cell receives a cooperative control requesting notification, this cell does not necessarily become a cooperative cell.

This corresponds to the case in which, for example, it is not particularly necessary for a cell whose receive quality is very good to operate as a cooperative cell in response to a request from the leader cell, when taking only this cell into consideration.

Such a cell may include a procedure for sending a response to reject a cooperative control request reported from the leader cell. In addition, because a cell whose receive quality is poor due to a cause different from inter-cell interference has small merit in cooperating with peripheral cells, this cell may reject a cooperative control request.

Furthermore, it can be considered that because a cell whose traffic is very low has small merit in cooperating with peripheral cells and interferes not so greatly with other cells, this cell may reject a cooperative control request. In such a case, transmission of a response notification rejecting cooperative control, instead of a response notification agreeing with cooperative control, is performed in step S112 in FIG. 2. Thereafter, the process proceeds to step S120, and data transmission is appropriately performed in this cell alone.

In addition, the base station apparatus in the leader cell which has received a response notification rejecting cooperative control does not set a corresponding cell as a cooperative cell in step S104 in FIG. 2, but sets only the other cells which have sent a response notification agreeing with cooperative control as cooperative cells and performs processing thereafter.

By performing the above control, the base station apparatus in each cell can determine by itself whether the cell operates as a cooperative cell, thereby realizing communication in accordance with the circumstances of each cell. In addition, in the case of rejecting cooperative control as above, information representing a rejection period may be added to response information and sent. By stating in advance a rejection period, the circumstances in which a cooperative control requesting notification and a response notification are exchanged again and again can be avoided.

In addition, information representing a rejection period may be sent as a cooperative control response notification. In this case, in the case of agreeing with cooperative control, a rejection period may be set to zero. In addition, a cooperative control request sent from the base station apparatus in the leader cell may have some levels. This corresponds to the case in which a cooperative control request is divided into two levels, strong and weak (or 2 and 1), for example, the levels representing the degree of strength/weakness of request.

It is assumed here that, in the case where the leader cell sends a cooperative control requesting notification whose degree of request is strong, the base station apparatus in a cooperative cell that has received this notification cannot reject cooperative control; in the case where the degree of request is weak, the base station apparatus in the cooperative cell can reject cooperative control in accordance with the circumstances of the cooperative cell.

The degree of request may be made different in accordance with a partner cell to be notified of a cooperative control request. For example, a requesting notification whose degree of request is weak may be sent to the cell 1, and a requesting notification whose degree of request is strong may be sent to the cell 2. In addition, although there are two levels for the degree of request here, more levels may be provided and more detailed control may be performed.

In addition, although the case in which a cell rejects cooperative control in accordance with the cell's circumstances has been discussed above, in the case where cooperative control requesting notifications are sent from a plurality of leader cells, because it is impossible to simultaneously agree with these multiple requests, a procedure to reject any of the requests becomes necessary. To do this, it is sufficient to perform control such as that which accepts only the first cooperative control requesting notification and rejects a cooperative control requesting notification received thereafter. That is, after a response notification agreeing with a cooperative control requesting notification is sent, until this cooperative control ends, another cooperative control requesting notification is rejected. In this case, as has been mentioned earlier, other leader cells may be notified of a rejection period, that is, a period of time until the current cooperative control ends.

In addition, a reason for rejection may be added to a response notification and returned. This corresponds to control in which, for example, reasons for rejecting a cooperative control requesting notification, such as that indicating the receive quality is high, the traffic is very low, and other cooperative control is currently being performed, are determined in advance and are represented with numerals or the like, and leader cells are notified of these numerals. As has been described above, by reporting a reason for rejection from a certain cell, that cell's circumstances can be reported to another leader cell, and this leader cell, which has grasped the circumstances, can efficiently perform control thereafter.

In addition, a leader cell may select which cells serve as cooperative cells. Although it has been described in this embodiment that a cooperative control requesting notification is transmitted to peripheral cells, actually the number of cells that can perform cooperative control is limited, and it is impossible to perform cooperative control with many cells. Therefore, in order to achieve good characteristics as efficiently as possible, it is necessary to find an effective cooperation partner and request this partner to perform control. To this end, a leader cell may select several cells from among the peripheral cells, and may inform the selected cells of a cooperative control requesting notification.

Here, the selection criterion includes that, for example, this cell is a cell that interferes with the leader cell with high power, or conversely the leader cell interferes with this cell with high power. Therefore, in the case where cell selection is performed on the basis of such criterion, it is necessary to exchange in advance information regarding the power of interference with each other. To this end, each cell may exchange information regarding the receive quality or the power of interference with each other. In addition, control based on information exchanged between cells, such as OI (Overload Indication), HII (High Interference Indication), and RNTP (Relative Narrowband Tx Power), may be performed. Here, information such as OI, HII, and RNTP is adopted in LTE (Long Term Evolution) systems.

Among them, OI notifies the peripheral cells of the level of interference from the peripheral cells in units of resource blocks. Such control becomes possible in which, a cell that receives OI indicating a high interference level is considered to be highly probable to give high interference to adjacent cells, and such a cell becomes a leader cell and selects a cell that has reported OI as a cooperative cell. In addition, a cell that reports OI may become a leader cell and may select a destination to which OI is reported as a cooperative cell. At this time, a cooperative control requesting notification may be sent along with OI.

In addition, HII notifies an adjacent cell of the position of a resource block which is positioned at a cell edge and to which a terminal apparatus that performs transmission with high transmit power is allocated. The adjacent cell, which has received this information, can perform scheduling not to allocate a terminal apparatus to that resource block. In the case where such information is used to select a cooperative cell, it is conceivable that a cell that receives HII and that grasps that an adjacent cell is going to allocate a terminal apparatus that performs transmission with high transmit power becomes a leader cell, and the adjacent cell may be selected as a cooperative cell. In addition, a cell that reports HII may become a leader cell, and a destination to which HII is reported may be set as a cooperative cell. At this time, a cooperative control requesting notification may be sent along with HII.

RNTP is information that represents, in each resource block, whether the transmit power in downlink is lower than a threshold. Because a cell that has received this information can grasp the transmit power in an adjacent cell, the cell can perform scheduling that takes this into consideration. In the case where such information is used to select a cooperative cell, it is conceivable that a cell that receives RNTP and that grasps that an adjacent cell is going to perform transmission with high transmit power becomes a leader cell, and the adjacent cell may be selected as a cooperative cell. In addition, a cell that reports RNTP may become a leader cell, and a destination to which RNTP is reported may be set as a cooperative cell. At this time, a cooperative control requesting notification may be sent along with RNTP.

In addition, it has been described in this embodiment that, separately from a cooperative control response notification, information regarding the channel variations of each cell (cooperative cell) is returned to the leader cell. Unlike this, notification of the leader cell of information regarding the channel variations may be treated as information that indicates agreement with a cooperative control request.

[2. Second Embodiment]

In the first embodiment, the example in which each cell operates as a leader cell or a cooperative cell in accordance with the cell's circumstances has been discussed. As has been mentioned earlier, in this case, it can be considered that the circumstances in which a plurality of cells becomes leader cells, and different leader cells send cooperative control requesting notifications to the same cell occur. In such a case, in the first embodiment, control has been discussed in which cooperative control is performed with a leader cell that first sends a cooperative control requesting notification, and requests from the other cells are rejected. Here, unlike such control, control for avoiding the circumstances in which a plurality of cells positioned nearby simultaneously become leader cells as much as possible will be discussed.

First, there is a method that treats a plurality of cells as a cell group and determines that only one cell operates as a leader cell in the cell group. Accordingly, the circumstances in which a plurality of cells that are positioned nearby and that constitute the same cell group operate as leader cells at the same time can be avoided.

It is however necessary to independently determine whether each of cells included in a cell group operates as a leader cell. To this end, it is conceivable to use a method that sequentially transfers the right to become a leader cell to an adjacent cell. This is such that only the base station apparatus in a cell that has the right to become a leader cell can start operating as a leader cell, and the other cells included in the cell group cannot operate as leader cells.

The base station apparatus with the right to become a leader cell takes into consideration the circumstances of the cell to which the base station apparatus belongs or the circumstances of peripheral cells, and determines whether to start cooperative control as a leader cell. In the case of performing cooperative control, the base station apparatus performs control indicated in step S102 in FIG. 2 onward. In the case of not performing cooperative control, the base station apparatus transfers the right to become a leader cell to an adjacent cell, and proceeds to processing in step S120. That is, a cell that obtains this right does not necessarily operate as a leader cell. The base station device of a cell to which the right to become a leader cell has been transferred performs similar control.

Such a method that transfers the right to become a leader cell between base station apparatuses may be referred to as polling, and information that is actually transferred may be referred to as a polling packet. It is sufficient for apparatuses connected by a wired network, such as base station apparatuses in a cellular system, to transfer this polling packet via the wired network. In the case where apparatuses are not connected by wire, such as in a wireless LAN system, it is sufficient to transfer a polling packet by wireless communication.

In addition, a polling packet may be transferred between base station apparatuses at predetermined time intervals (periodically) or adaptively. In a periodical case, control is such that, for example, a polling packet is obtained, cooperative control is started, transmission of a predetermined number of frames is completed, and then the polling packet is transferred to the next base station apparatus.

In addition, the number of frames until the polling packet is transferred to the next base station apparatus may be set to be different for each base station apparatus. In contrast, in the case where the interval is adaptive, the timing to transfer the polling packet to the next base station apparatus is determined for each base station apparatus, and control is such that, for example, at the time the traffic in a cell becomes less than or equal to a certain amount or communication of a terminal apparatus to which data transmission based on cooperative control is performed ends, the polling packet is transferred. Regardless of whether it is periodical or not, in the case where it is determined that it is unnecessary to perform cooperative control, the polling packet may promptly be transferred to the next base station apparatus.

Regarding the selection of a cell to which the polling packet is transferred, a cell may be selected at random from among cells belonging to a cell group, or a cell may be selected on the basis of information such as the cell ID. Alternatively, the polling packet may be exchanged in a predetermined order; or information indicating the log of the polling packet may be sent along with the polling packet to the next base station apparatus, and a base station apparatus serving as a destination to which the polling packet is sent may be selected on the basis of the log. In particular, if there is a base station apparatus that has not received the polling packet yet, the polling packet may preferentially be sent to that base station apparatus.

By performing such control, the circumstance in which a plurality of cells positioned nearby start operating as leader cells can be avoided.

Figure 7:
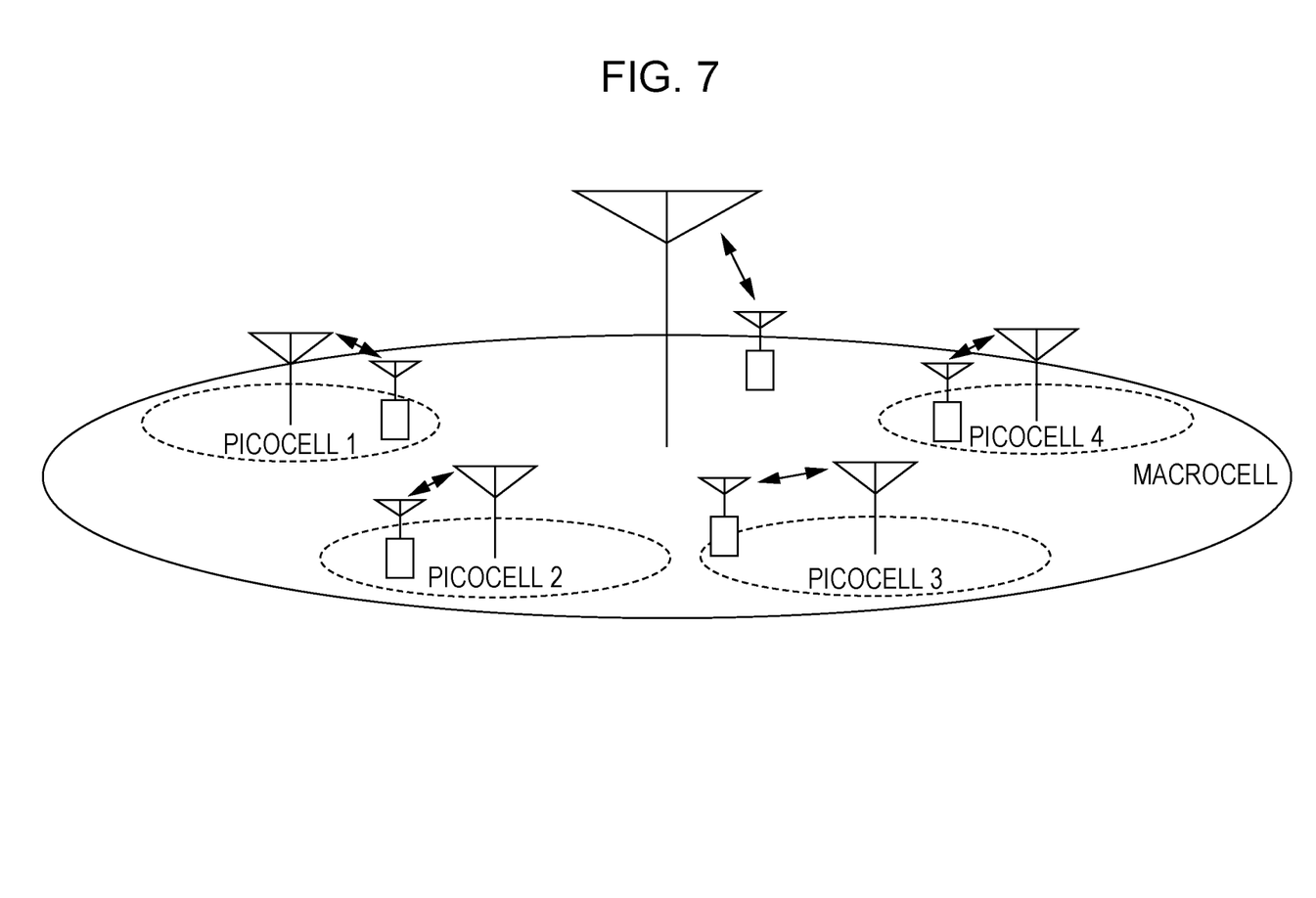
FIG. 7 a diagram for describing the entirety according to a second embodiment.

In addition, among cells included in a cell group, a certain cell may be fixed as a leader cell. A cell to be fixed as a leader cell is desired to be a cell positioned near the center of the cell group, and whether to perform cooperative control may be determined by taking into consideration the circumstances of that cell and the entire cell group. In addition, as illustrated in FIG. 7, in a system called a heterogeneous network in which there is a plurality of picocells (or femtocells) with a small cell radius in a macrocell with a large cell radius, the macrocell may operate as a leader cell.

In this case, the macrocell determines whether to perform cooperative control by taking into consideration the circumstances of the macrocell and the circumstances of the picocells. Even though the macrocell operates as a leader cell, it is unnecessary for the macrocell to serve as a target of cooperative control and to perform transmission using a transmit weight. The macrocell may operate as an intermediator that centrally manages the plurality of picocells.

Furthermore, also in this embodiment, as has been mentioned in the first embodiment, the maximum number of cooperative cells may be set in advance, and a cooperative control requesting notification may be sent to the base station apparatuses in cells, the number of which is less than or equal to that maximum number of cooperative cells. In addition, the configuration of each base station apparatus and each terminal apparatus can be realized with the same configuration as the first embodiment.

[3. Modification]

In the above-described embodiments, the configurations and the like illustrated in the attached drawings are not limited to these and can be appropriately changed within the scope in which the advantageous effects of the invention are achieved. Additionally, the embodiments can be appropriately changed without departing from the scope of the object of the invention.

In addition, although data transmission from a base station apparatus to a terminal apparatus, that is, downlink transmission, has been described in the above embodiments, the embodiments are not limited to this and are applicable to data transmission from a terminal apparatus to a base station apparatus. Also in that case, it is efficient to perform control in which the base station apparatus in a leader cell collectively calculates transmit/receive weights.

In addition, although a cellular system has been mainly described, the embodiments are not limited to this and are applicable to a wireless LAN system or the like. In that case, any of APs (Access Points) in wireless LAN systems that are adjacent to one another and that use the same frequency band plays the role of the base station apparatus in a leader cell, and APs in the remaining systems each play the role of the base station apparatus in a cooperative cell. Here, in the case where a cellular system serves as a target, it has been assumed that information exchange between base station apparatuses is performed via a wired network. Since APs in wireless LAN systems are not directly connected by a wired network, information exchange between APs may be performed by wireless communication. That is, a cooperative control requesting notification, a cooperative control response notification, information regarding the maximum number of cooperative cells, channel information, and the like are wirelessly transmitted.

In addition, although a control procedure targeted to the IA technology has been described as an example of cooperative control in a plurality of cells in the above-described embodiments, a procedure in any of the embodiments is not limited to the IA technology and is applicable to the case in which other cooperative control technology, particularly technology for controlling at least a transmit weight on the basis of information regarding channel variations reported from the receiver side, is used. This is technology that multiples a transmit signal in each transmitter by a transmit weight that moderates interference to receivers in cells or systems (wireless LAN system or the like) that are adjacent to one another and that use the same frequency. A specific transmit weight includes a weight calculated on the basis of the ZF (Zero Forcing) criterion that completely suppresses interference to receivers in adjacent cells or systems, a weight calculated on the basis of the MMSE (Minimum Mean Square Error) criterion that takes into consideration a noise component and that maximizes SINR, and the like. It is assumed that a transmitter in each cell or system uses these transmit weights such that receivers in adjacent cells or systems do not interfere with each other.

In this case, step S108 in FIG. 2 is changed to calculate only a transmit weight, and an arithmetic operation for calculating the weight is performed instead of the algorithm illustrated in FIG. 3. Note that calculation of a transmit weight in this case need not be collectively performed by a leader cell, and may be performed by the base station apparatus in each cell.

Here, for example, in the case of calculating a weight on the basis of the ZF criterion in an environment in which there are one cell or system and three adjacent cells or systems, when it is assumed that $H_1$ is a channel reported from a receiver in a communication partner, and $H_2$, $H_3$, and $H_4$ are channels reported from receivers in the adjacent cells or systems, a transmit weight becomes $([H_1{}^T H_2{}^T H_3{}^T H_4{}^T]^T)^{-1}$. When each transmitter performs data transmission using such a transmit weight, cooperative control that moderates interference with adjacent receivers can be performed.

In addition, a program for realizing the functions described in the embodiments may be recorded on a computer-readable recording medium, and the processing of each unit may be performed by causing a computer system to read and execute the program recorded on the recording medium. It is assumed that the "computer system" referred to here includes an OS and hardware such as peripheral apparatuses.

In addition, it is also assumed that the "computer system" includes a homepage providing environment (or a display environment) in the case of using the WWW system.

In addition, the "computer-readable recording medium" refers to a portable medium such as a flexible disk, a magneto-optical disc, ROM, CD-ROM, or the like, or a storage apparatus such as a hard disk built into the computer system. Furthermore, the "computer-readable recording medium" may also encompass media that briefly and dynamically retain the program, such as a communication line in the case where the program is transmitted via a network such as the Internet or a communication channel such as a telephone line, as well as media that retain the program for a given period of time, such as a volatile memory inside the computer system acting as a server or client in the above case. Moreover, the above-described program may be for realizing part of the functions discussed earlier, and may also realize the functions discussed earlier in combination with programs already recorded in the computer system.

REFERENCE SIGNS LIST 10, 11, 12, 13, 14 base station apparatuses
100 higher layer
101 modulator
102 transmit weight multiplier
103-1 to 103-4 D/A units
104-1 to 104-4 wireless units
105-1 to 105-4 transmit antenna units
106 channel estimation signal generator
107 receive antenna unit
108 wireless unit
109 A/D unit
110 receiver
111 quality determining unit
20, 21, 22, 23, 24 terminal apparatuses
200-1 to 200-4 receive antenna units
201-1 to 201-4 wireless units
202-1 to 202-4 A/D units
203 signal separator
204 receive weight multiplier
205 demodulator
206 higher layer
207 channel estimator
208 transmitter
209 D/A unit
210 wireless unit
211 transmit antenna unit

The invention claimed is:

1. A communication apparatus in a communication system which includes a plurality of cells each of which is a communication area in which a communication apparatus and at least one terminal apparatus perform wireless communication in each of the plurality of cells, wherein
at least one of the communication apparatuses in the plurality of cells sends another one of the communication apparatuses in one of neighboring cells of the plurality of cells a cooperative control requesting notification with at least two levels of strength;
the at least one of the communication apparatuses receives cooperative control response notifications which show acceptance of the cooperative control from the another one of the communication apparatuses in the neighboring cells when the level of strength of the cooperative control requesting notification is a first level;
the at least one of the communication a apparatuses receives cooperative control response notifications which show either acceptance or rejection of the cooperative control request from the another one of the communication apparatuses in the neighboring cells when the level of strength of the cooperative control requesting notification is a second level that is less than the first level; and
a maximum number of cooperative cells of the plurality of cells is predetermined.

2. The communication apparatus according to claim 1, wherein
the at least one of the communication apparatuses stops sending the cooperative control requesting notification during a known period when the at least one of the communication apparatuses has received the cooperative control response notification which shows rejection of the cooperative control request.

3. The communication apparatus according to claim 1, wherein
the cooperative control response notification which shows rejection of the cooperative control request includes information representing a rejection period of the cooperative control.

4. The communication apparatus according to claim 3, wherein
the at least one of the communication apparatuses stops sending the cooperative control requesting notification during the rejection period.

5. A base station apparatus in a communication system which includes a plurality of cells each of which is a communication area and a base station apparatus and at least one terminal apparatus perform wireless communication in each of the plurality of cells, wherein
at least one of the base station apparatuses receives a cooperative control requesting notification with at least two levels of strength from another one of the base station apparatuses in neighboring cells of the plurality of cells;
when the at least one of the base station apparatuses receives the cooperative control requesting notification with a first level, the base station apparatus sends a cooperative control response notification which shows acceptance of the cooperative control request to the another one of the base station apparatuses,
when the at least of the base station apparatuses receives the cooperative control requesting notification with a second level that is less than the first level, the at least one of the base station apparatuses sends a cooperative control response notification which shows acceptance or rejection of the cooperative control request to the another one of the base station apparatuses, and
a maximum number of cooperative cells of the plurality of cells is predetermined.

6. The base station apparatus according to claim 5, wherein the at least one of the base station apparatuses does not receive the cooperative control requesting notification during a known period when the at least one of the base station apparatuses has sent the cooperative control response notification which shows rejection of the cooperative control request.

7. The base station apparatus according to claim 5, wherein the cooperative control response notification which shows rejection of the cooperative control request includes information representing a rejection period of the cooperative control.

8. The base station apparatus according to claim 7, wherein the at least one of the base station apparatuses does not receive the cooperative control requesting notification during the rejection period.

* * * * *